United States Patent
Kang et al.

(10) Patent No.: US 10,467,350 B2
(45) Date of Patent: Nov. 5, 2019

(54) OPTIMIZATION OF PLY ORIENTATIONS FOR MULTI-LAYER COMPOSITE PARTS

(71) Applicant: The Boeing Company, Chicago, IL (US)

(72) Inventors: Laura Sumi Kang, Seattle, WA (US); Adriana Willempje Blom, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 15/018,075

(22) Filed: Feb. 8, 2016

(65) Prior Publication Data

US 2017/0228473 A1    Aug. 10, 2017

(51) Int. Cl.
    *G06F 17/50* (2006.01)

(52) U.S. Cl.
    CPC .......... *G06F 17/50* (2013.01); *G06F 17/5095* (2013.01); *G06F 2217/44* (2013.01)

(58) Field of Classification Search
    CPC ... G06F 17/50; G06F 17/5095; G06F 2217/44
    USPC ............................................................ 703/1
    See application file for complete search history.

(56) References Cited

U.S. PATENT DOCUMENTS

| | | | |
|---|---|---|---|
| 6,076,080 A | 6/2000 | Morscheck et al. | |
| 6,915,252 B1 | 7/2005 | Li | |
| 2005/0163975 A1* | 7/2005 | Chen | B29C 70/30 428/192 |
| 2009/0199948 A1* | 8/2009 | Kisch | B29C 70/38 156/64 |
| 2011/0004451 A1 | 1/2011 | Krog | |
| 2012/0312589 A1 | 12/2012 | Balcome et al. | |
| 2014/0288893 A1* | 9/2014 | Blom | G06F 17/5018 703/1 |

OTHER PUBLICATIONS

Bruyneel_2014 (A two-step optimization approach for the optimal design of composite structures, including geometric non-linear behavior, design rule and manufacturing constraints; 4th Aircraft Structural Design Conference, Royal Aeronautical Society, Queens University, Belfast, Oct. 7-9, 2014). (Year: 2014).*
U.S. Appl. No. 14/836,369, filed Aug. 26, 2015, Adriana W. Blom et al., 'Ply Blending and Stacking Sequence'.

(Continued)

*Primary Examiner* — Brian S Cook
(74) *Attorney, Agent, or Firm* — Duft & Bomsen, PC

(57) ABSTRACT

Systems and methods are provided for composite part design. One embodiment is an apparatus that designs a composite part. The apparatus includes a controller configured to generate a design for the part. The controller subdivides the part into blocks that each comprise a contiguous stack of layers within the part, identifies rules that constrain how layers that have different fiber orientations are stacked within the part, generates a guide for a block that prescribes a fiber orientation for each layer of the block, and identifies sublaminates comprising that are compatible with the guide for the block. The controller subdivides the part into panels, and selects one of the compatible sublaminates for one of the panels of the block, based on compatible sublaminates for neighboring panels.

22 Claims, 12 Drawing Sheets

(56) References Cited

OTHER PUBLICATIONS

Beckwith et al., Designing with Composites: Suggested "Best Practices" Rules, SAMPE Journal, vol. 45, No. 1, Jan./Feb. 2009.
Bruyneel et al., Stacking sequence optimization for constant stiffness laminates based on a continuous optimization approach, Structural & Multidisciplinary Optimization 46(6), 783-794, 2012.
Kennedy et al., A Regularized Discrete Laminate Parametrization Technique with Application to Wind-Box Design Optimization, 53rd AIAA/ASME/ASCE/AHS/ASC Structures, Structural Dynamics and Materials Conference Apr. 23-26, 2012, Honolulu, Hawaii.
Meddaikar et al., Blended Composite Optimization combining Stacking Sequence Tables and a Modified Shepard's Method, 11th World Congress on Structural and Multidisciplinary Optimization, Jun. 7-12, 2015, Sydney Australia.
U.S. Appl. No. 14/836,333, filed Aug. 26, 2015, Adriana W. Blom et al., 'Ply Blending and Stacking Sequence'.
Bruyneel et al; A two step optimization approach for the optimal design of composite structures; 4th Aircraft structural Design Conference; Oct. 9, 2014; pp. 1-12, XP055370315.
European Search Report; Appl EP17155009; dated Jul. 7, 2017.
Irisarri F-X et al; Optimal design of laminated composite structures with ply drops using stacking sequence tables; Composite Structures; Sep. 4, 2013.
Eurpopean Office Action—Application 17155009.8-1224; dated Jun. 25, 2018.
Ming Zhou; A Comprehensive Process for Composite Design Optimisation; Altair Technology Conference 2009.
European Office Action; Application 17155009.8-1224; dated Mar. 15, 2019.

\* cited by examiner

| BLOCK GUIDE | | Sub1 | Sub2 | Sub3 | Sub4 | Sub5 |
|---|---|---|---|---|---|---|
| LAYER 1 | 45 | 45 | 45 | | 45 | 45 |
| LAYER 2 | 90 | 90 | 90 | | 90 | 90 |
| LAYER 3 | -45 | -45 | | -45 | -45 | |
| LAYER 4 | 0 | | 0 | 0 | | |
| LAYER 5 | 45 | 45 | | 45 | | |
| LAYER 6 | 90 | 90 | | 90 | | |
| LAYER 7 | -45 | -45 | -45 | | | -45 |
| LAYER 8 | 0 | 0 | 0 | 0 | 0 | 0 |

FIG. 12

SUBLAMINATE GENERATION — 1202

↓

GUIDE GENERATION — 1204

↓

PLY SEQUENCE OPTIMIZATION — 1206

| | FIBER ANGLE | LAYER | PANEL | | | | | | |
|---|---|---|---|---|---|---|---|---|---|
| | | | A | B | C | D | E | F | |
| BLOCK | 45 | 1 | 1 | 1 | 1 | 1 | 1 | 1 | ~1402 |
| | -45 | 2 | 1 | 1 | 1 | 0 | 0 | 0 | ~1404 |
| | 0 | 3 | 0 | 1 | 0 | 0 | 1 | 0 | ~1406 |
| | 90 | 4 | 1 | 1 | 0 | 1 | 0 | 1 | ~1408 |
| | 0 | 5 | 0 | 0 | 1 | 1 | 1 | 1 | ~1410 |

1400

OPTIMIZATION OF PLY ORIENTATIONS FOR MULTI-LAYER COMPOSITE PARTS

FIELD

The disclosure relates to the field of composite part construction, and in particular, to designing multi-layer composite parts.

BACKGROUND

Many composite parts (e.g., carbon fiber products, such as aircraft wings) are created as a series of vertically stacked plies which are bonded/cured together over time. In this manner, plies of constituent material are iteratively laid up and cured to consolidate into the composite part. To enhance the strength of a composite part with respect to stresses applied in different directions, each ply of constituent material within the composite part may include fibers that are oriented in a different direction than the fibers of neighboring plies. The combination of fiber orientations for the plies within the part dictates the strength of the part with respect to different kinds of stresses.

For complex parts that are divided into panels, the process becomes more complicated. For example, a design for the part may dictate complex and differing patterns of fiber orientations. These fiber orientations may even vary across multiple panels that together form the part. With complex parts that are intended to bear great stresses and are mission-critical (e.g., the wings of an aircraft), it remains a complicated process to ensure that desired strength is provided. Thus, current techniques for designing composite parts focus on ensuring part strength, and do not address manufacturing efficiency for a given part.

SUMMARY

Embodiments described herein provide techniques for optimizing designs for multi-layer, multi-panel composite parts. These techniques ensure not only that the part is designed with desired strength, but also ensure the part may be manufactured efficiently by an Automated Fiber Placement (AFP) machine, an Automated Tape Laying (ATL) machine, pick-and-place techniques, or even hand layup.

One embodiment is a method that includes designing a multi-layer composite part by subdividing the part into blocks that each comprise a contiguous stack of layers within the part, identifying rules that constrain how layers that have different fiber orientations are stacked within the part, and generating a guide for a block that prescribes a fiber orientation for each layer of the block and that complies with the rules. The method also includes identifying sublaminates comprising consecutive ply sequences for the block that are compatible with the guide for the block and comply with the rules, subdividing the part into panels that each comprise a fraction of the area of the composite part, and selecting one of the compatible sublaminates for one of the panels of the block, based on compatible sublaminates for neighboring panels.

A further embodiment is an apparatus that includes an interface configured to receive input indicating a geometry of a multi-layer composite part, and a controller configured to generate a design for the part by subdividing the part into blocks that each comprise a contiguous stack of layers within the part. The controller is further configured to generate the design by identifying rules that constrain how layers that have different fiber orientations are stacked within the part, generating a guide for a block that prescribes a fiber orientation for each layer of the block and that complies with the rules, identifying sublaminates comprising consecutive ply sequences for the block that are compatible with the guide for the block and comply with the rules, subdividing the part into panels that each comprise a fraction of the area of the composite part, and selecting one of the compatible sublaminates for one of the panels of the block, based on compatible sublaminates for neighboring panels. The apparatus further includes a memory configured to store the design as a combination of selected sublaminates for use by an Automated Fiber Placement (AFP) machine constructing the part.

A further embodiment comprises a non-transitory computer readable medium embodying programmed instructions which, when executed by a processor, are operable for performing a method. The method includes designing a multi-layer composite part by subdividing the part into blocks that each comprise a contiguous stack of layers within the part, identifying rules that constrain how layers that have different fiber orientations are stacked within the part, and generating a guide for a block that prescribes a fiber orientation for each layer of the block and that complies with the rules. The method also includes identifying sublaminates comprising consecutive ply sequences for the block that are compatible with the guide for the block and comply with the rules, subdividing the part into panels that each comprise a fraction of the area of the composite part, and selecting one of the compatible sublaminates for one of the panels of the block, based on compatible sublaminates for neighboring panels.

A further embodiment comprises another method. The method includes receiving input indicating a geometry of a multi-layer composite part, generating a design indicating an arrangement of ply sequences for the part; and subdividing the part into blocks that each comprise a contiguous stack of layers within the part. The method also includes identifying rules that constrain how layers that have different fiber orientations are stacked within the part, identifying sets of fiber orientations for a block that comply with the rules, and subdividing the block into panels that each comprise a fraction of the area of the composite part. Additionally, the method includes selecting one of the sets of fiber orientations for one of the panels, based on sets of fiber orientations for neighboring panels, and configuring a memory to store the design for use by an Automated Fiber Placement (AFP) machine constructing the part.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11 is a chart illustrating sublaminates that are compatible with a block of a composite part in an exemplary embodiment.

FIG. 12 is a flowchart illustrating additional steps implemented for operating a composite design system in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
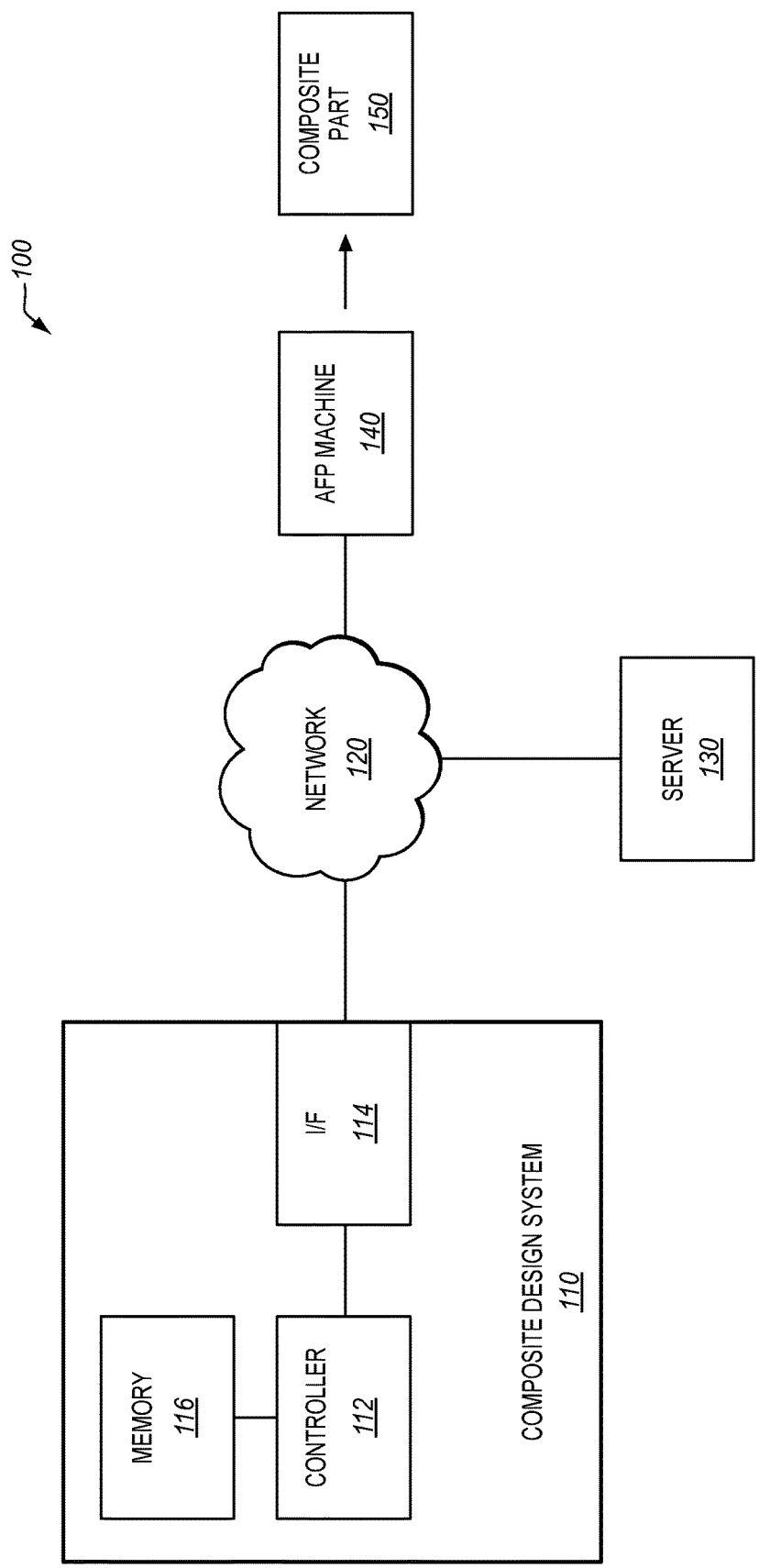
FIG. 1 is a block diagram of a composite manufacturing environment in an exemplary embodiment.

FIG. 1 is a block diagram of a composite manufacturing environment 100 in an exemplary embodiment. According to FIG. 1, environment 100 includes composite design system 110, which is capable of designing a composite part 150. Composite design system 110 optimizes part 150 to conform with stacking sequence rules that ensure part 150 has desired strength. Composite design system 110 also ensures that part 150 is capable of being manufactured efficiently by AFP machine 140.

In this embodiment, composite design system 110 includes controller 112, interface (I/F) 114, and memory 116. Controller 112 utilizes I/F 114 to access rules constraining how part 150 may be constructed, information describing the geometry of part 150, and/or other information. I/F 114 may acquire this information from server 130 via network 120. Controller 112 also generates designs for part 150, optimizing the designs to ensure that they will more efficiently utilize the time of AFP machine 140. These designs may be stored by controller 112 within memory 116. Controller 112 may be implemented, for example, as custom circuitry, as a processor executing programmed instructions, or some combination thereof. I/F 114 comprises any suitable combination of circuitry and/or components for transmitting data (e.g., via network 120). Memory 116 comprises any suitable data storage device such as a hard disk, flash memory, etc.

Further details of the operation of composite design system 110 will be described with regard to FIG. 5 below. However, FIGS. 2-4 are discussed before FIG. 5 in order to provide context illustrating an exemplary composite part that may be designed by system 110.

Figure 2:
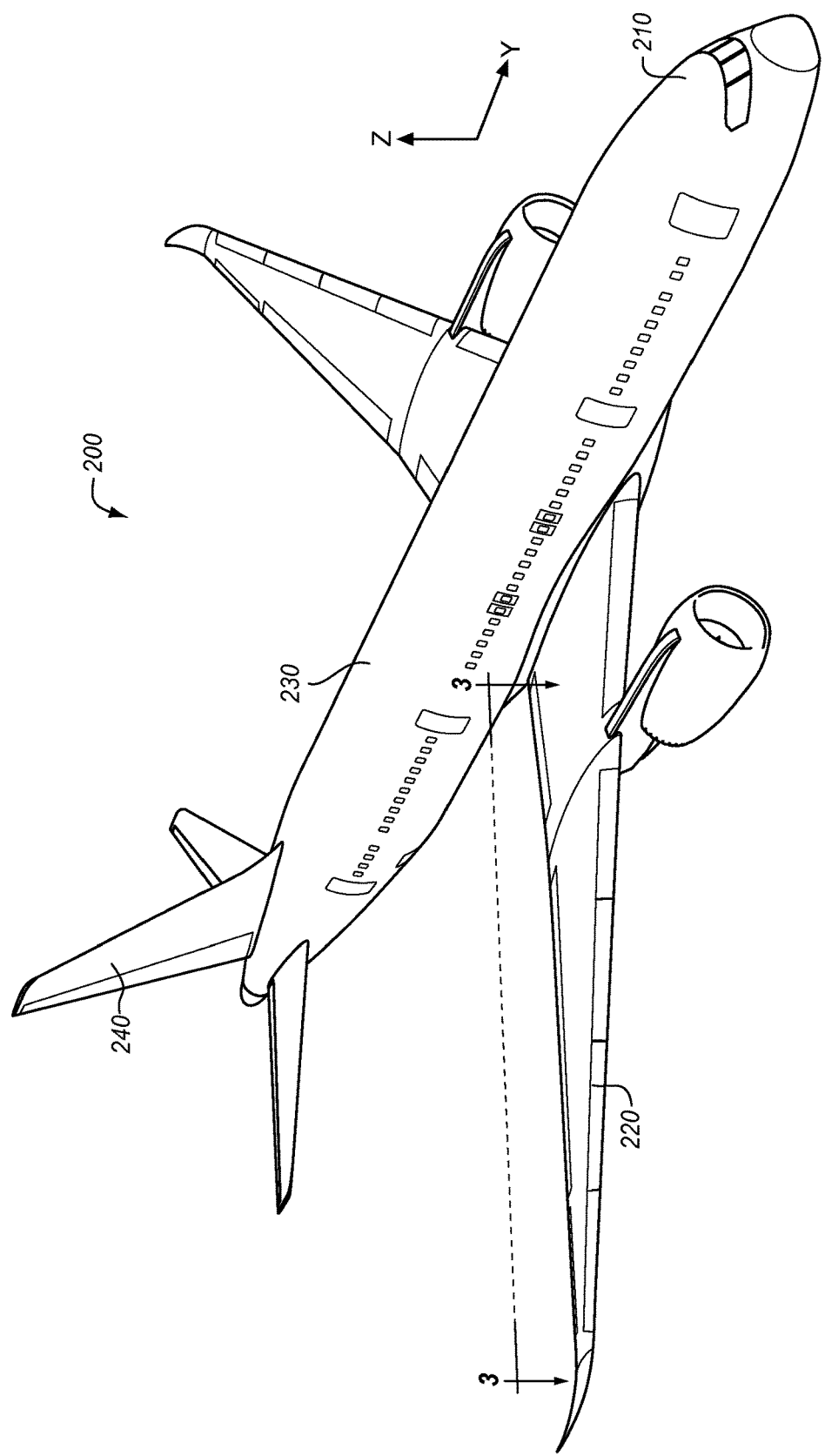
FIG. 2 is a diagram of an aircraft in an exemplary embodiment.

FIG. 2 is a diagram of an aircraft 200 in an exemplary embodiment. Aircraft 200 includes nose 210, wing 220, fuselage 230, and tail 240. Further discussion of aircraft 200 will focus on a multi-panel, multi-layer composite part for wing 220. However, similar techniques to those described herein may be applied to any suitable composite part.

Figure 3:
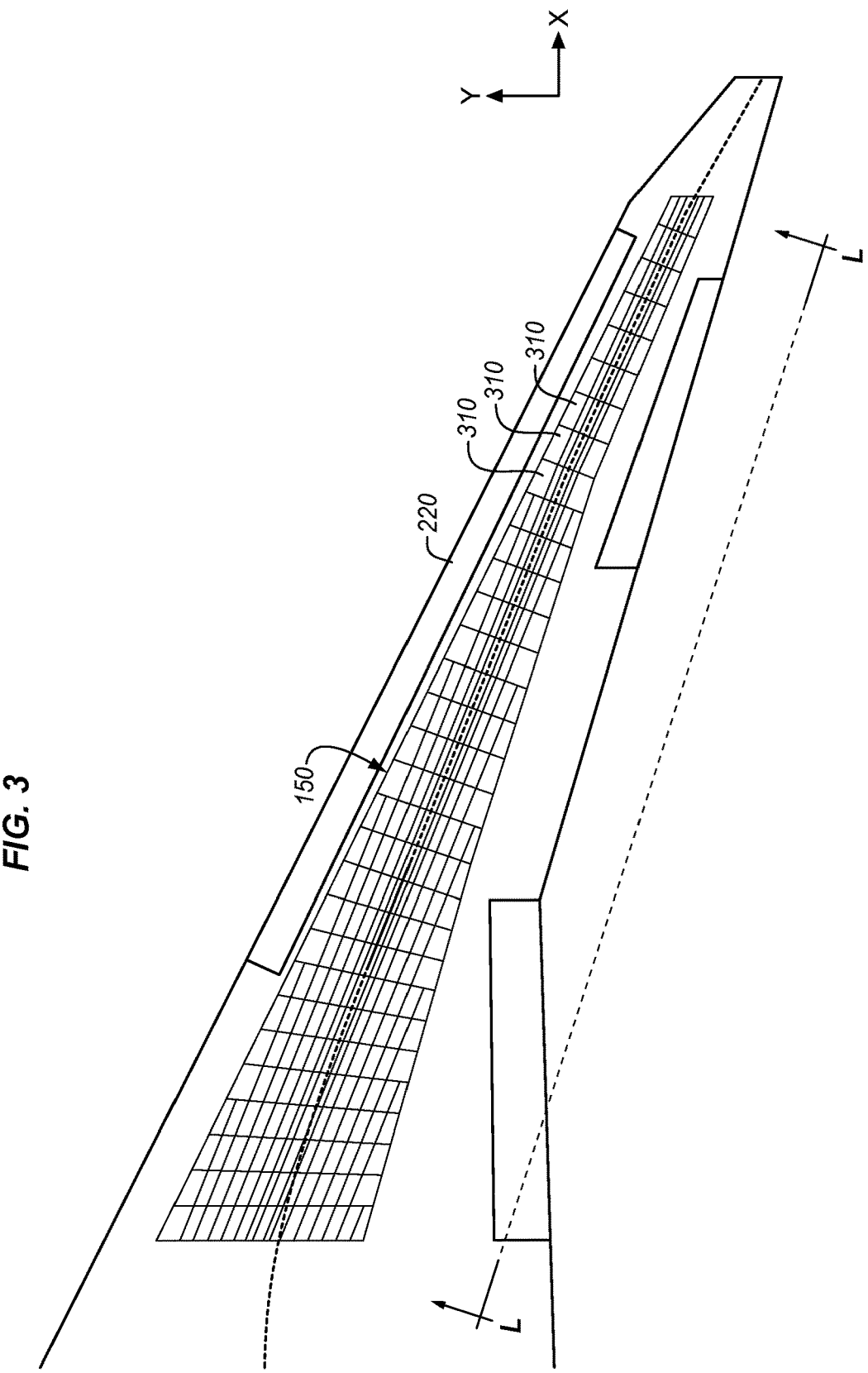
FIG. 3 is a diagram of a wing of an aircraft that includes a composite part divided into panels in an exemplary embodiment.

FIG. 3 is a diagram of a wing 220 of an aircraft that includes a composite part 150 divided into panels 310 in an exemplary embodiment. Specifically, composite part 150 comprises a portion of an upper wing skin. The view for FIG. 3 is shown by view arrows 3 of FIG. 2. As shown in this diagram, each panel 310 comprises a small portion of the area of part 150. View arrows L along FIG. 3 indicate a possible view along the length of wing 220.

Figure 4:
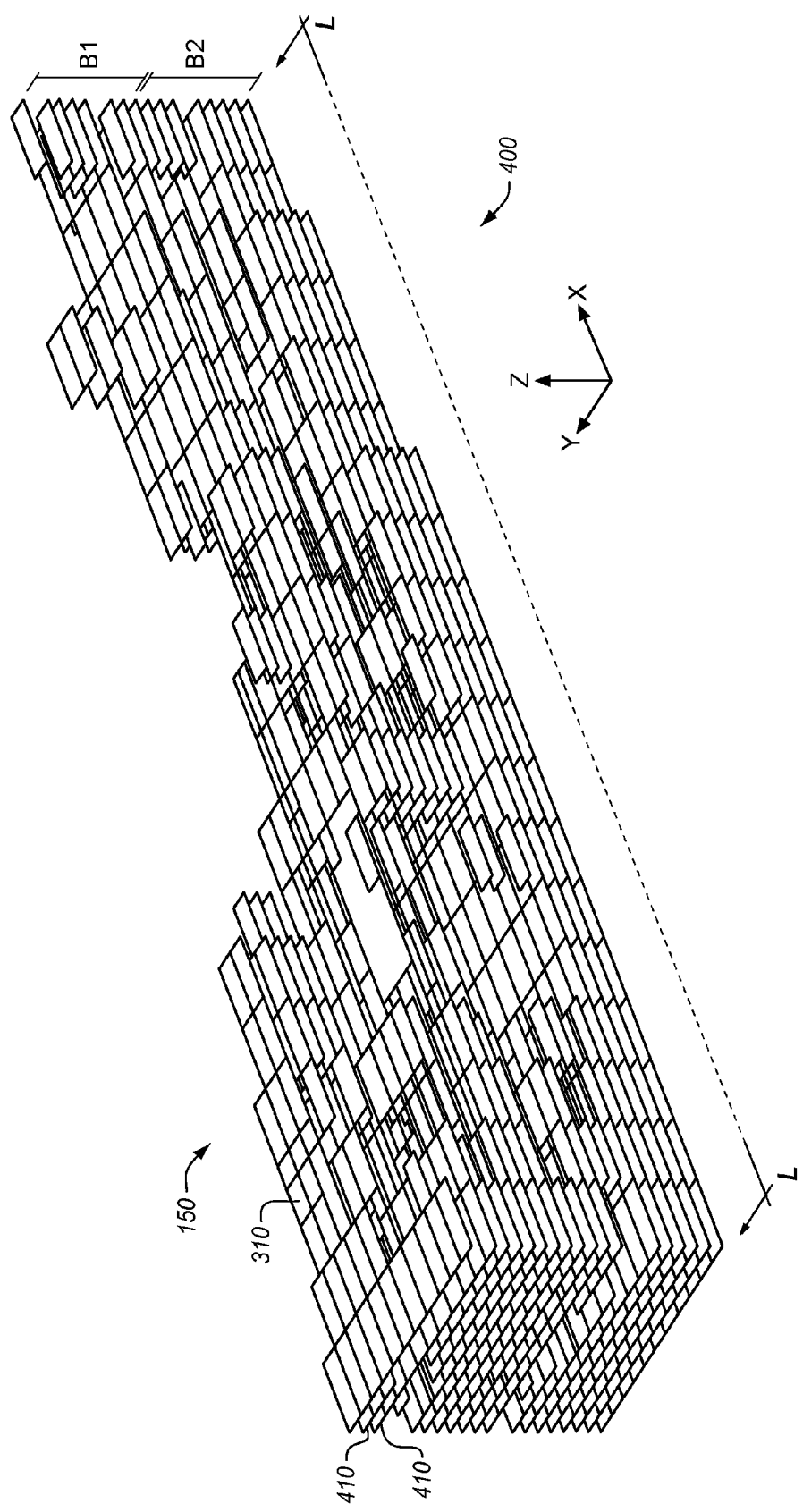
FIG. 4 is a diagram of a design for a portion of a part that includes multiple layers divided into panels in an exemplary embodiment.

FIG. 4 is a diagram of a design 400 for a portion of part 150 that includes multiple layers 410 divided into panels 310 in an exemplary embodiment. FIG. 4 includes arrows for view L shown in FIG. 3, in order to indicate how FIG. 4 aligns with FIG. 3. FIG. 4 illustrates that part 150 includes multiple layers 410. A layer 410 indicates which panels in design 400 will be laid up at the same fiber orientation by AFP machine 140 onto part 150, before AFP machine 140 proceeds to lay up the next layer. The next layer may either have a different fiber orientation or have plies that cover one or more panels already covered in the previous layer. A layer may therefore designate each of the plies that are laid by AFP machine 140 onto part 150, before part 150 undergoes curing to consolidate the plies onto part 150. As used herein, the combination of plies that are physically laid for a single layer is referred to as a "ply sequence," while a contiguous combination of plies within a single layer is referred to as a "ply shape." A ply sequence may, for example, include one ply shape or multiple ply shapes. FIG. 4 also illustrates that each layer 410 is divided into panels 310. Each panel 310 of each layer 410 may or may not be laid up with a ply, depending on the chosen design.

A number of specific stacking sequence rules/guidelines may be used to dictate how fibers are oriented across the layers of part 150 in order to ensure that part 150 exhibits a desired strength and is capable of enduring stresses applied during its lifetime. These may be referred to as "stacking sequence rules." In FIG. 4, design 400 divides part 150 along its depth (here, direction Z) into blocks (B1, B2). Each block comprises a set of contiguous layers within part 150. By dividing part 150 into blocks, ply sequences may be optimized on a block-by-block basis to comply with the stacking sequence rules. Optimizing on a block-by-block basis helps to ensure that optimization processes for a composite part can be completed in a reasonable amount of time.

Illustrative details of the operation of composite design system 110 will now be discussed with regard to FIG. 5. Assume, for this embodiment, that a new design for composite part 150 is being created by composite design system 110, and that the new design shall comply with the stacking sequence rules in order to ensure that part 150 has adequate strength. At the same time, system 110 will optimize the new design for manufacturability to ensure that time at AFP machine 140 is more efficiently utilized.

Figure 5:
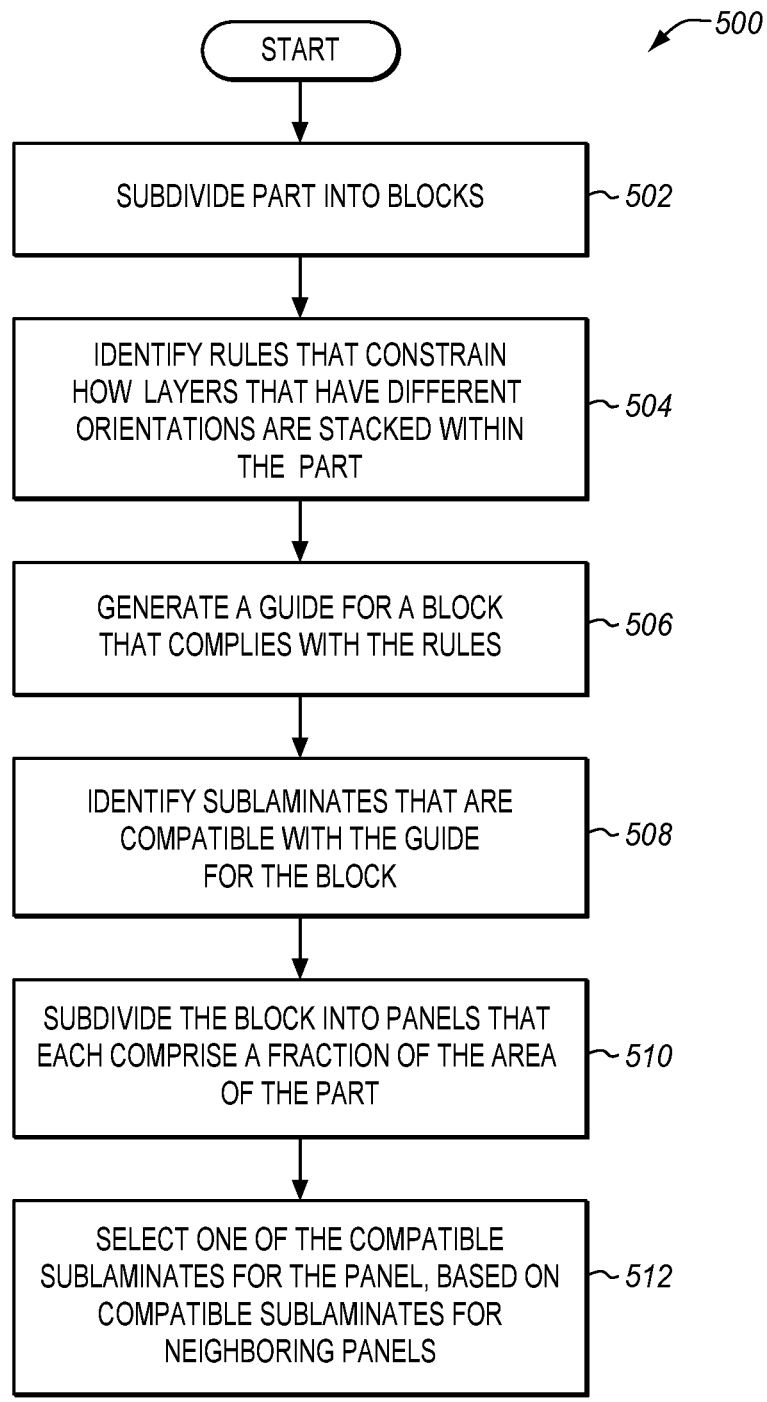
FIG. 5 is a flowchart illustrating a method for operating a composite design system in an exemplary embodiment.

FIG. 5 is a flowchart illustrating a method 500 for designing a multi-layer composite part 150 in an exemplary embodiment. The steps of method 500 are described with reference to composite design system 110 of FIG. 1, but those skilled in the art will appreciate that method 500 may be performed in other systems. The steps of the flowcharts described herein are not all inclusive and may include other steps not shown. The steps described herein may also be performed in an alternative order.

Controller 112 initiates by receiving input via I/F 114 indicating a geometry of a multi-layer part (part 150). This information may indicate which panels are adjacent/neighboring within part 150, and may further include an expected number of plies for each different fiber orientation to be laid at each panel (e.g., a final depth/thickness and composition of each completed panel in part 150). In a complex design, part 150 exhibits a changing thickness along its length such that some panels will include more plies than other panels. The geometry information may further include information subdividing part 150 along its depth into layers and/or blocks. According to FIG. 5, in step 502 controller 112 subdivides part 150 into blocks (e.g., blocks B1-B2). Each block comprises a contiguous subset/stack of the layers of part 150. This subdividing of part 150 into blocks allows part 150 to be optimized on a block-by-block basis by controller 112.

In step 504, controller 112 identifies stacking sequence rules that constrain how layers that have different fiber orientations are stacked within part 150. In one embodiment, the rules define four allowable fiber orientations for a layer (0°, 45°, −45°, and 90°), the rules dictate that no more than four adjacent layers may have the same fiber orientation, the rules require that each block include at least one layer of each orientation, etc. Systematic evaluation of these rules in an optimization environment is complicated by the fact that plies may be selectively omitted from panels within a given layer.

In step 506, controller 112 generates a guide (i.e., an arrangement of fiber orientations for a block) that complies with the rules. The guide prescribes a fiber orientation for each layer of the block. The guide may be generated by reference to the stacking sequence rules discussed above.

In step 508, compatible "sublaminates" are identified for the generated guide. A sublaminate is a set of consecutive ply sequences for the block, and may be assigned on a panel-by-panel basis. Compatible sublaminates are subsets of the layers in the guide for the block. Layers indicated in a guide may be omitted from a sublaminate, but the sequence indicated in the guide must be maintained in order for the sublaminate to be compatible. The sublaminates also are chosen to ensure that they are individually compatible with the stacking sequence rules. Moreover, the set of sublaminates may be further reduced to ensure that any combination of sublaminates through the thickness also comply with the stacking sequence rules. The guides and compatible sublaminates may be pre-calculated by controller 112 and filtered to ensure compliance with the rules, thereby ensuring that part 150 has a desired strength.

However, while any of these sublaminates may be chosen to provide desired strength for part 150, it remains a problem to determine what sublaminates will enhance manufacturability. To this end, controller 112 subdivides the part into panels that each comprise a fraction of the area of part 150 in step 510.

Controller 112 further selects a compatible sublaminate for each panel in each block, based on the compatible sublaminates for neighboring panels in step 512. For example, controller 112 may select a compatible sublaminate for a panel with the objective of increasing the number of contiguous plies laid by an AFP machine in a ply sequence. This technique may therefore reduce the amount of time taken by the AFP machine while laying-up ply sequences for the layers of the block.

Once compatible sublaminates are chosen for each panel in each block, the design is completed. Therefore, controller 112 may configure memory 116 to store the design for use by AFP machine 140 when constructing part 150.

Utilizing method 500 above, the ply shapes and/or sequences for individual layers may be chosen in order to facilitate the speed of manufacturing/lay-up for each block. This in turn ensures that complex parts utilize designs that reduce their overall cost and/or time of manufacture. Further details of the optimization techniques used herein are described with respect to the examples section below.

Examples

In the following examples, additional processes, systems, and methods are described in the context of a composite design system 110 that reduces layup time for a composite part. The system 110 optimizes ply sequences while also ensuring that stacking sequence rules are met.

For many AFP processes a substantial amount of time is spent laying up plies of fiber (this is called "in-cycle time"). However, the rest of the time consists of machine down time (e.g., cleaning the machine, replacing cutters, fixing broken tows, etc.), inspection for each layer, and rework of fibers that have already been laid up. Thus, designs which reduce in-cycle and/or out-of-cycle time for an AFP machine 140 enhance the overall speed of production for a composite part. The following exemplary optimization metrics are examples of metrics that may be used (alone or in combination) to ensure that ply sequences for the layers of a composite part are chosen in such a manner as to increase manufacturing speed of a layer, block, or entire composite part. The exemplary metrics provided below are illustrative, and different metrics may be utilized as desired in operating environments.

FIGS. 6-9 illustrate exemplary optimization metrics used to ensure that ply shapes are chosen which reduce the overall speed of laying-up a composite part (e.g., via an AFP machine). In the following discussion, the term "course" refers to a band of material laid down by an AFP or automated tape laying machine along a specified curve that follows the desired fiber orientation on the surface. The band of material may consist of one or more strips of material. These strips may be dispensed and cut independently. Plies are formed by sequentially laying one or multiple courses that fill up the area within the ply boundaries. Depending on the direction the AFP head moves strips are started or stopped at a ply boundary. Starting a strip is called an "add", while stopping a strip is called a "cut". If a course is parallel to the ply boundary, part of the ply boundary may be formed by the outer edge of the outermost strip of a course.

Optimization Metric 1—Total Boundary

Figure 6:
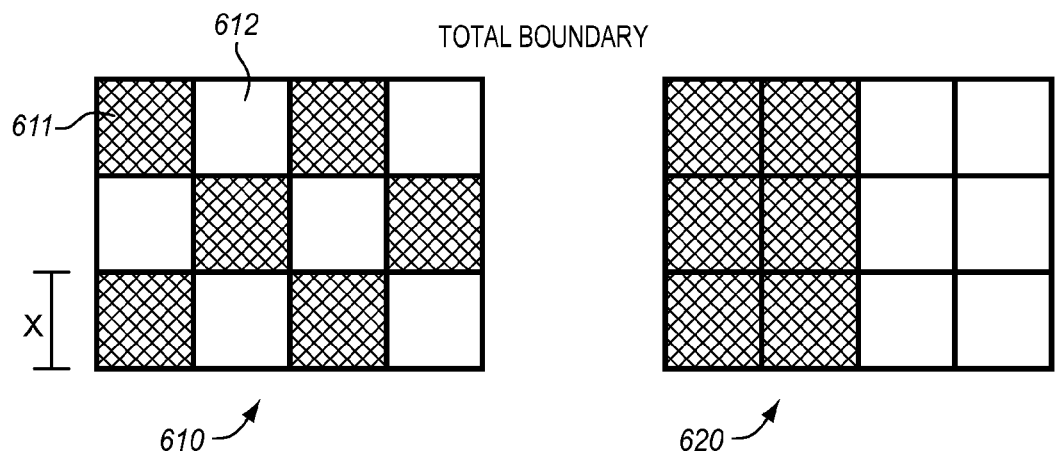
FIGS. 6-9 illustrate exemplary optimization metrics for ply sequences in an exemplary embodiment.

FIG. 6 illustrates two different ply sequences (610, 620) for a four panel long, three panel wide layer of a composite part. Each panel is square, and has a length of X. As shown in FIG. 6, shaded panels 611 are filled with a ply, while unshaded panels 612 are not filled with a ply. Since the panels that are filled with a ply are not contiguous, the total boundary length of ply sequence 610 is equal to (4 sides per panel)*(6 panels)=24X. In contrast, the total boundary length of ply sequence 620 is equal to 8X. Since some AFP machines slow down when making a cut to a ply, and since the total border length of a ply shape and/or sequence is strongly correlated with the number of cuts made by an AFP machine, optimizing a layer based on ply shape enhances manufacturing speed. The time to manufacture ply sequence 620 is therefore shorter than for ply shape 610, at least because ply sequence 610 exhibits more cuts and adds, which is likely to cause more AFP machine down time. Furthermore, since ply shape 610 exhibits more cuts, more time will be spent by an operator inspecting the ply sequence, and there will be a greater likelihood that an edge will need rework (since there is more overall edge length).

Furthermore, ply shapes with a shorter total boundary are more likely to use long courses. Using longer courses instead of shorter courses ensures less idle time at an AFP machine, as the machine travels through the air from one course to the next. Longer courses also result in faster tape-laying because the AFP machine can reach its maximum speed while laying a course, since it takes time to get up to maximum speed. Thus, the total boundary length of a ply sequence stands as a good indicator for the manufacturing efficiency of that ply sequence.

Optimization Metric 2—Cut Boundary

Figure 7:
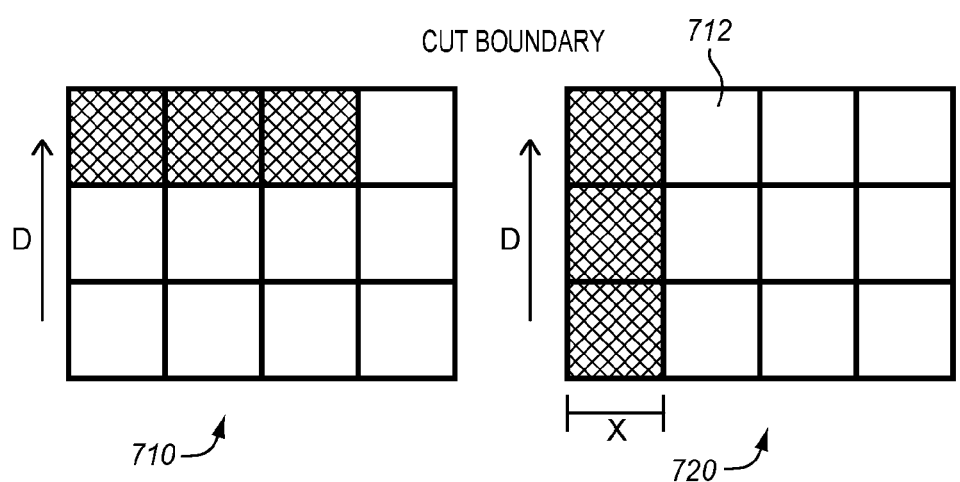

FIG. 7 illustrates two different ply sequences (710, 720) for a four panel long, three panel wide layer of a composite part. Each panel is square, and has a length on its side of X. As shown in FIG. 7, shaded panels 711 are filled with a ply, while unshaded panels 712 are not filled with a ply. FIG. 7 further illustrates a direction (D) in which the AFP machine will be oriented when laying down plies for this layer. Furthermore, in this embodiment, each course is exactly one panel wide. It can quickly be understood that only one course of the AFP machine is used to create ply sequence 720, while three courses are used to create ply sequence 710. Thus, ply sequence 710 may require the AFP machine to cut, stop, and reposition two more times than ply sequence 720. An increased number of cuts and courses also increases the chances of machine error when laying-up a ply sequence, as well as increasing the overall inspection and rework time for that ply sequence. Inspection generally takes place at the location of each cut and add on a composite part, as well as in-between individual courses. Thus using fewer courses to generate a ply sequence increases the manufacturing rate of the composite part. As used herein, any boundaries where courses are cut or added are referred to as "cut boundaries."

Optimization Metric 3—Internal Corners

Figure 8:
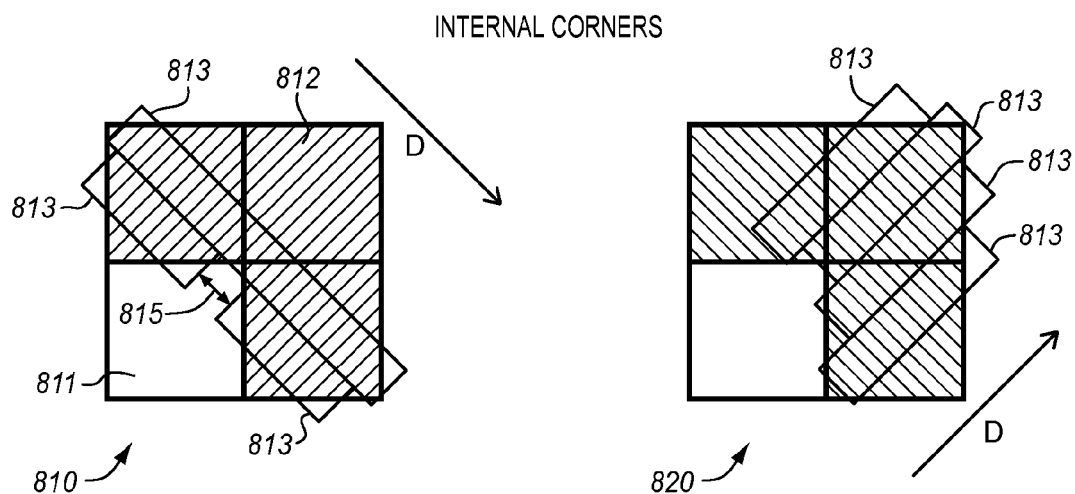

FIG. 8 illustrates two different ply sequences (810, 820) that each comprise plies 812 laid up for a layer of a composite part. As shown in FIG. 8, shaded panels 812 are filled with a ply, while unshaded panels 811 are not filled with a ply. FIG. 8 further illustrates that for ply sequence 810, an extra cut 815 must be made in order to bridge a gap between panels, owing to AFP machine orientation D. In contrast, in ply sequence 820, the orientation (D) of the AFP machine allows for courses to be laid up in a single course without needing to stop and restart the AFP machine. As used herein, corners within a ply shape that require an AFP machine to stop, cut, and then resume (e.g., to lay multiple collinear courses in a single course) are referred to as internal corners. Internal corners occur if the fiber orientation of a layer is not aligned with the boundaries of the ply sequence for that layer. Optimizing ply sequences to reduce the number of internal corners reduces number of stops and restarts of an AFP machine during a single run/pass. Internal corners may be identified, for example, based on a known orientation of fiber within the layer being laid up.

Optimization Metric 4—Number of Courses

Figure 9:
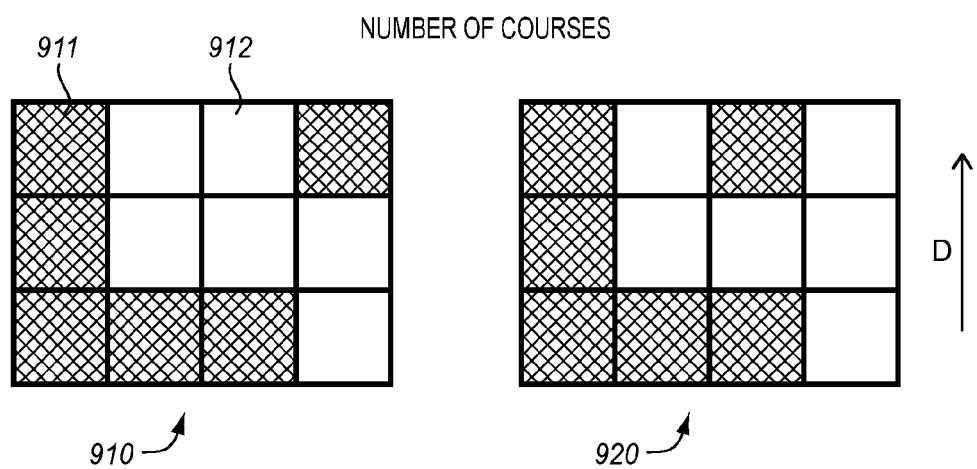

FIG. 9 illustrates two different ply sequences (910, 920) for a four panel long, three panel wide layer of a composite part. Each panel is square, and has a length on its side of X. As shown in FIG. 9, shaded panels 911 are filled with a ply, while unshaded panels 912 are not filled with a ply. FIG. 9 further illustrates a direction (D) in which the AFP machine will be oriented when laying down plies. This may, for example, be the same orientation as the fiber orientation used for plies laid up by the AFP machine. FIG. 9 illustrates that even when there are the same number of filled panels in a ply sequence, with the same size border, the speed of laying up that ply sequence can vary depending on the ply shapes and relative positions chosen. In this example, ply sequence 920 is more manufacturing efficient since it only uses three one-panel wide courses, while ply sequence 910 uses four courses. Laying-up multiple plies with fewer courses also reduces off-part motion at an AFP machine, which increases manufacturing speed.

Optimization Metric 5—Average Course Length

An AFP machine will not reach its maximum lay-up speed if a course is too short. This means that shorter courses result in longer lay-up times. Hence, it may be desirable to calculate average course length, (e.g., defined as ply sequence area divided by the number of courses within the ply shape) when optimizing ply shapes. The average course length for the entire part can be calculated by dividing the total area for all ply sequences by the total number of courses.

Exemplary Stacking Sequence Rules

Stacking sequence rules may constrain how a ply sequence is designed for a layer. Table 1 below illustrates an exemplary set of stacking sequence rules that may be utilized when designing a composite part.

TABLE 1

Stacking Sequence Rules

| Rule | Description |
|---|---|
| A | Employ balance and symmetry across the layers of the composite part |
| B | Do not stack more than a threshold number of adjacent layers having the same fiber orientation. |
| C | Use at least one layer of each fiber orientation within the composite part |
| D | Add 45° layers in pairs of +45° and −45° |
| E | Minimize the difference in fiber orientation angle between different plies |

In this example, some rules may be flagged as mandatory for consideration of controller 112 (e.g., no violations are allowed), while other rules may be flagged as guidelines that may be violated under certain circumstances (e.g., at locations that are closer to the mid-plane of the composite part). In this example the rules are specific to laminates that consist of 0°, 90° and ±45° plies. Other rules may apply to laminates that contain plies with different fiber orientations. The presented method is not restricted to four fiber orientations.

Composite Part Guides

Figure 10:
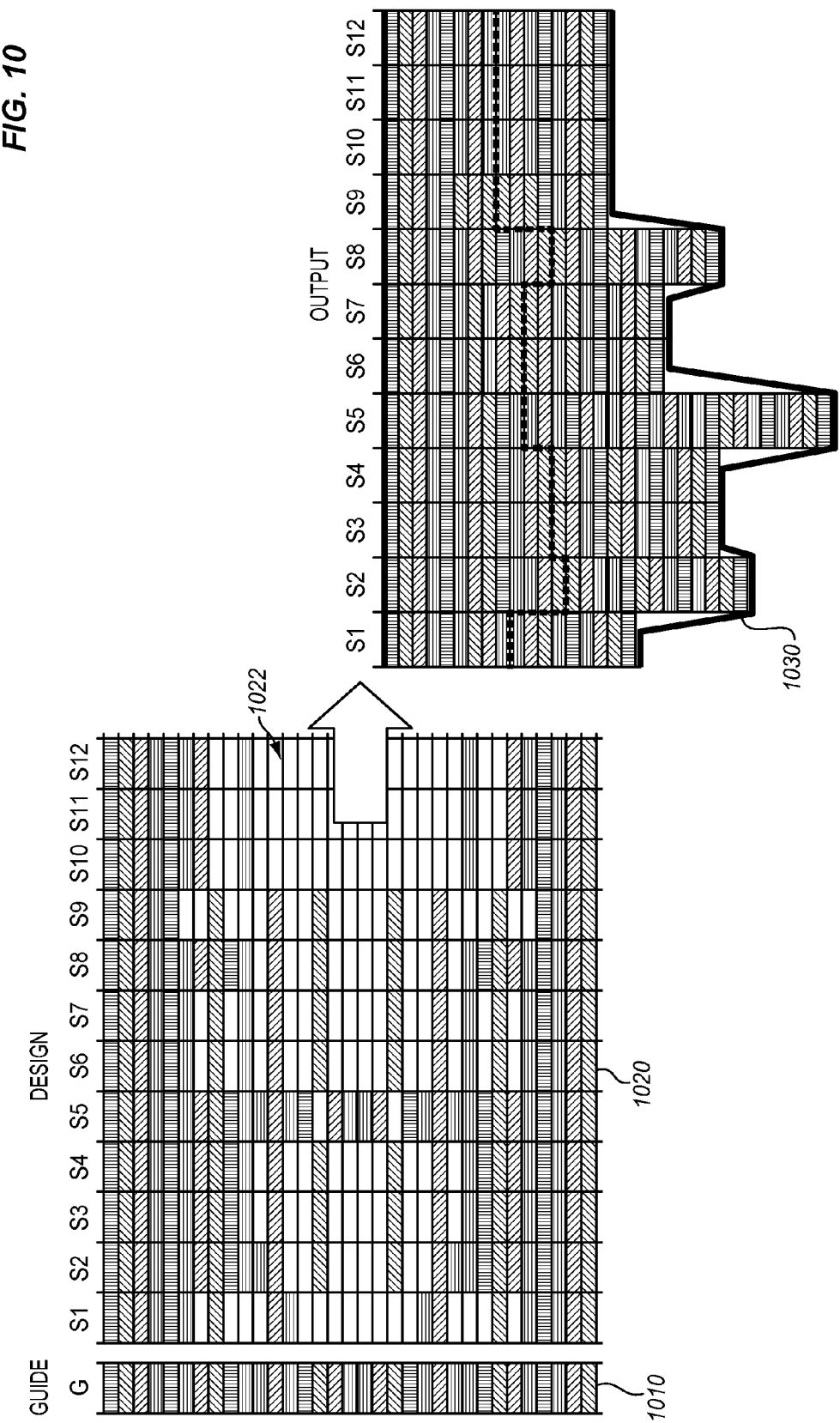
FIG. 10 is a diagram illustrating a relationship between a design for a composite part, and an output resulting in the composite part.

When designing a composite part, a guide may be constructed to indicate the fiber orientation that will be used for each layer/ply sequence. Controller 112 may then selectively elect to include plies within the design based on the guide, on a layer-by-layer and panel-by-panel basis. The design actually chosen for a part may include gaps (in the tabular representation of a part design) where a ply is not laid for a given layer defined by the guide. However, when plies are applied by an AFP machine onto the composite part, the plies that are separated by a gap in the design will be directly laid atop each other. This means that the plies laid for a given layer are not necessarily coplanar when laid up on the composite part. That is, as shown in FIG. 10, when a guide 1010 is used to create a design 1020 for a composite part comprising panels S1-S12, and design 1020 includes one or more empty portions 1022 within its layers. The actual laid-up output 1030 for the product is condensed such that ply sequences separated across the thickness by empty panels in design 1020 will be placed adjacent to each other in output 1030. A mid-plane of output 1030 is shown as a dotted line on a panel by panel basis for FIG. 10.

Sublaminates

Sublaminates may be chosen based upon a guide for a corresponding block (i.e., a template dictating a fiber orientation for each layer of the composite part). Thus, if a guide for a block includes eight ply sequences that each have a predefined fiber orientation, a sublaminate includes up to eight ply sequences for an ordered subset of those fiber orientations. In embodiments where a guide is used, not all ply sequences from the guide need to be present in the panel sublaminate. However, all plies in the sublaminate should at least be present in the guide for the block and in the correct order to fit. In this example, two sublaminates are compatible if they could both be used in a block without violating the guide for that block. To illustrate this concept, diagram 1100 of FIG. 11 shows that sublaminates 1-5 (sub1-5) are capable of being placed in the same guide for the block. An empty cell in a row indicates that no material is placed for that panel for that layer. For example, sublaminate "Sub1" could be written as [45/90/−45/45/90/−45/0], while sublaminate "Sub2" could be written as [45/90/0/−45/0]. "Sub1" is compatible with "Sub2," because "Sub1" can be generated by omitting layer 4 from the guide block laminate, i.e. [45/90/−45/0/45/90/−45/0], while "Sub 2" may be generated by omitting layers 3, 5 and 6. Sublaminates are not compatible if they cannot both be inserted into a block without violating the fiber orientations required for the layers of that block. For example, a sublaminate with fiber orientations [45/0/0/45] would not be compatible with the guide depicted in FIG. 11, because there is only one 0° layer between layers 1 and 5, and there is no 45° layer after layer 8.

Optimization Model

The optimization model used by controller 112 involves three steps as shown in FIG. 12. The first step involves generating sublaminates in step 1202. Hence, ply sequences that are compatible with each block should be determined. Once a library of compatible sublaminates has been generated, guides may be generated for the blocks in step 1204. Using a guide for the block, ply sequences may be optimized in step 1206.

The objective of sublaminate generation is to create a library of sublaminates with feasible stacking sequences in a pre-processing step and to exclude infeasible regions of the design space before optimization is performed. This step helps to shrink the size of the solution space that will be searched during optimization. To illustrate this concept, if four fiber orientations are allowed for each of ten layers in a sublaminate, there will be $4^{10}$ (i.e., 1,048,576) possible stacking sequences if each layer includes a ply. The number of options increases to $5^{10}$ (i.e., 9,765,625) if empty panels are allowed within a layer. Hence, it remains beneficial to reduce the number of potential sublaminates a priori in order to ensure that the optimization process converges in a reasonable amount of time. Table 2 shows exemplary criteria for ten layer sublaminates generated in this manner. These criteria may be developed based on a prior calculated fiber orientation distribution for the part. These criteria may also change based on the overall fiber orientation distribution expected for the part. If distribution drastically changes from panel to panel, multiple libraries of sublaminates may be used (e.g., different libraries that each serve panels having different characteristics).

TABLE 2

Exemplary Criteria for Sublaminates

Each sublaminate includes at least four and at most ten ply sequences
Each sublaminate always starts and ends with a 0° fiber orientation ply sequence
The number of ply sequences having a 90° fiber orientation within the sublaminate is less than two
The number of ply sequences having a 0° fiber orientation is less than four
The number of ply sequences having a 45° fiber orientation and the number of ply sequences having a −45° fiber orientation is the same, and 45° fiber orientations alternate with −45° fiber orientations
Either a 45° or a −45° fiber orientation will be used for the ply sequence placed after the first ply sequence having a 0° fiber orientation and before the last ply sequence having a 0° fiber orientation
The same fiber orientation will not be used on more than four consecutive ply sequences
If the same fiber orientation is repeated twice or three times in consecutive ply sequences, the ply sequences that come before and after those ply sequences are not permitted to be orthogonal to the consecutive ply sequences Using the above technique, stacking sequence rules may be complied with, even when different sublaminates are stacked on top of each other in the composite part.

Block and Guide Generation

Although stacking sequence rules should ideally be satisfied in each panel rather than each block, generating a guide that satisfies the stacking sequence rules reduces the number of stacking sequence rule violations in individual panels. In some cases, it may also be impossible to satisfy all stacking sequence rules for all panels within the composite part. In general, if a violation of the stacking sequence rules is required, it is allowed near the mid-plane of the composite part. It remains desirable to distinguish between inner blocks that are closest to the laminate mid-plane, and outer blocks that are closer to the laminate surface. In this example, outer blocks are required to satisfy the stacking sequence rules, including symmetry, while stacking sequence rules are allowed to be violated in the inner blocks. However, designs that use violating ply sequences in the inner blocks are discouraged via a penalty to the objective function during optimization.

The design may be subdivided by controller 112 into blocks based on input selecting a number of blocks, or based on input indicating a number of layers to include within each block. The size of each block is the same as the maximum number of ply sequences that could be chosen for the sublaminates in the previous step. For this example, each block defines ten layers. Having extra blocks improves the ability to optimize, but may also unnecessarily increase the number of ply sequences used for manufacturing, which reduces the overall manufacturing speed. In this example, all panels by definition use at least the outermost blocks of the part, and thus these blocks are not part of the optimization process. In this example, the controller further determines which blocks will be considered inner blocks where rule violations are allowed. If the number of inner blocks is too few, it may not be possible to find a feasible solution. If the number of inner blocks is too many, a solution may include an unnecessary number of stacking sequence violations. In this example, the number of inner blocks is even and is equally distributed around the mid-plane. Enforcing symmetry between blocks that are equidistant from the mid-plane helps to ensure that the rules are met and that the solution space is smaller. In the guide generation step, controller 112 may further assume that the inner blocks are symmetric about the mid-plane of the part, even though non-symmetry of the panel laminates in the inner blocks will be allowed later on when the design is chosen. A symmetric guide for the design improves the symmetry of the panel stacking sequences.

In this example, a binary decision variable $Y_{bs}$ is defined, which is 1 when sublaminate s is assigned to block b and 0 otherwise. Sublaminate s may be any sublaminate generated in the previous step which has the chosen number of ply sequences. As discussed above, blocks b only span half of the blocks defined in the problem due to symmetry. Integer optimization may be used to determine the guide design via the mathematical formulae below:

Minimize $\Sigma_i \varepsilon_{bs} Y_{bs}$ (1)

Subject to $\Sigma_s Y_{bs} = 1 \; \forall b$ (2)

$\Sigma_s n_{sk} Y_{bs} \geq \max_i(n_{ik}) \forall k$ (3)

The objective function (1) minimizes the total values assigned to each (b,s) combination. $\varepsilon_{bs}$ is a small random noise introduced to allow controlled permutations on the guide generation, such that the objective function finds a feasible solution, which may be controlled by changing the random number seed for $\varepsilon_{bs}$. The permutation $\varepsilon_{bs}$ may also be based on the solution from the ply optimization step to improve the solution by changing the guide rather than using a random permutation. Further and/or alternative algorithms may be utilized as desired, such as genetic algorithms.

Constraint (2) ensures that each block has only one sublaminate assigned. Constraint (3) ensures that the ply shape optimization based on the guide will have a feasible number of plies for each fiber orientation, by making sure the number of ply sequences with a given orientation in the solution is greater than the maximum number required for each panel. In this equation $n_{sk}$ represents the number of ply sequences with fiber orientation k in sublaminate s and $n_{ik}$ represents the number of plies with fiber orientation k in panel i.

With the blocks and guides defined for the composite part, controller 112 may proceed to optimization of ply sequences for the composite part in order to facilitate manufacturing.

Ply Shape Optimization

Figures 13, 14:
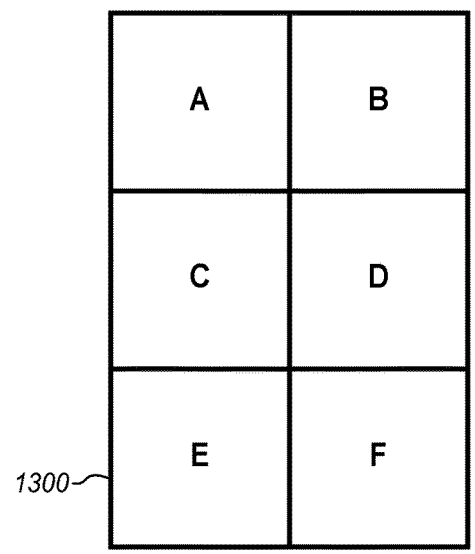
FIG. 13 illustrates a set of six adjacent panels of a composite part in an exemplary embodiment.
FIG. 14 illustrates an exemplary design for a block of a composite part comprising six adjacent panels in an exemplary embodiment.
Figure 15:
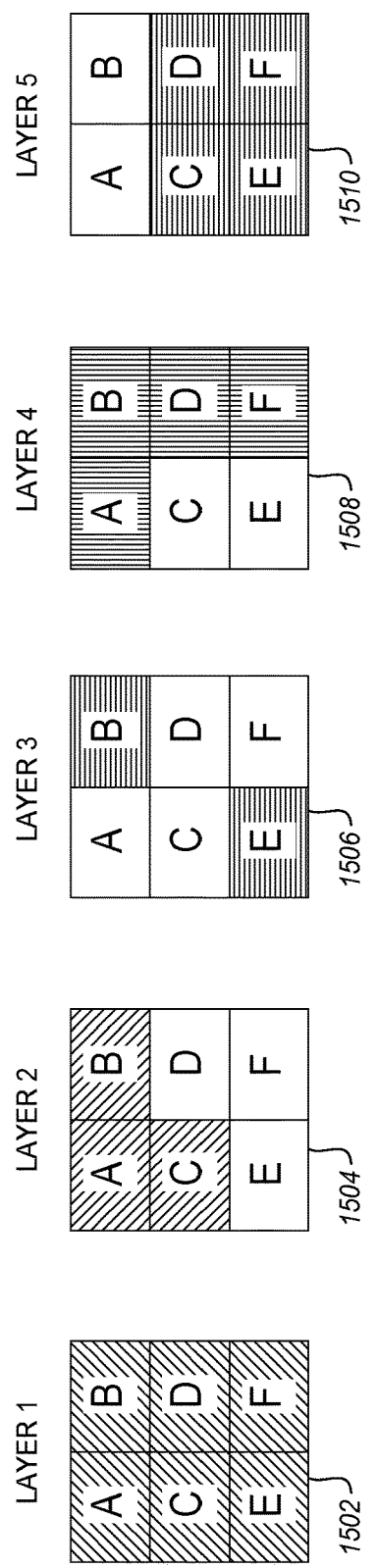
FIG. 15 illustrates ply shapes for each of multiple layers of the composite part of FIG. 12, based on the design of FIG. 13.

FIG. 13 illustrates a set 1300 of six adjacent panels (A, B, C, D, E, F) in an exemplary embodiment. FIG. 14 illustrates an exemplary design for a block (B) of a composite part comprising six adjacent panels in an exemplary embodiment. This design includes layers 1402, 1404, 1406, 1408, and 1410. For each layer, controller 112 determines which panels will be laid up with a ply of fiber. FIG. 15 illustrates ply sequences (1502, 1504, 1506, 1508, 1510) for each of multiple layers of the composite part of FIG. 13, based on the design of FIG. 14. For example, ply shape 1502 corresponds with layer 1402 of FIG. 14, ply shape 1504 corresponds with layer 1504 of FIG. 14, and so on.

The ply shape optimization process used by controller 112 ensures that the resulting ply sequences optimize manufacturability. In this example manufacturability is measured using the total ply boundary metrics. In this example, during optimization the designs for the inner blocks are chosen for individual layers of a panel. In contrast, for the outer blocks, the design is chosen by selecting a sublaminate from the library of feasible sublaminates created in the previous step that are compatible with the guide for each block.

To facilitate optimization, a binary decision matrix may be used to indicate whether or not to lay up a ply onto a panel in a given layer. In the matrix, this decision is indicated by binary decision variable $X_{ijk}$. This variable is 1 if the ply in panel i is present in ply sequence j, which has the fiber orientation represented by an orientation index k. Index i is defined for all panels in the problem and index j and k are defined for all individual ply sequences (as opposed to blocks) to ensure the objective function is calculated for the entire laminate and not just for the blocks used in the optimization. The orientation index k may have five values: one for each of four fiber orientations and a fifth value if no fiber will be laid up. Index k is listed with $X_{ij}$ for tracking purposes only, since the fiber orientation for sequence j is defined by the design. The guide for the design is represented by binary variables $Y_{jk}$, which are determined in the guide generation step. $Y_{jk}$ is 1 if ply sequence j has fiber orientation index k in the guide and 0 otherwise. During the optimization the decision variables $X_{ijk}$ for the inner blocks are changed directly, but for the outer blocks $X_{ijk}$ are determined by which sublaminate is picked. The choice of sublaminates is defined by binary decision variables $Z_{ibs}$, where $Z_{ibs}$ is 1 if panel i in block b is assigned with sublaminate s. Note that sublaminate s can only be picked from a library of sublaminates that are feasible and compatible with the guide for block b. For the calculation of the ply boundary length, a set of neighbors, $N = \{(i, i') | $ where i and i' are physically adjacent$\}$ is defined, which represents pairs of panels that are physically adjacent. The values of the Y variables described herein are not optimized at this point in time, because the Y values were assigned when the guide was determined in the previous step.

The following formulas may be used to optimize the design at this point in time, where four fiber orientations are allowed (0°, 45°, −45°, 90°).

$$\text{Maximize} \sum_{(i,i') \in N, j,k \in TL} W_{ii'} * X_{ijk} * X_{i'jk} - \sum_{j \in innerblocks} p * X_{ijk} \quad (4)$$

Subject to $$\sum_{j \in InnerBlocks} X_{ijk} + \sum_{j \notin InnerBlock} 2 * X_{ijk} = n_{ik} \quad (5)$$

$\forall i, k \in [0, 45, -45, 90]$ $$\sum_s Z_{ibs} \leq 1 \quad \forall i, b \in OuterBlocks \quad (6)$$

$$\sum_i X_{ijk} \leq M * Y_{jk} \quad \forall j, k \in [0, 45, -45, 90] \quad (7)$$

$$X_{ijk} = \sum_s \alpha_{sk} Z_{ib|j \in b,s} \quad \forall i, j \in OuterBlocks, k \quad (8)$$

$$Y_j + \sum_{ik \in [0,45,-45,90]} X_{ijk} \leq 0 \quad \forall j, k \in [0, 45, -45, 90] \quad (9a)$$

$$M * Y_j + \sum_{ik \in [0,45,-45,90]} X_{ijk} \geq 0 \quad (9b)$$

$$\sum_{j \in \{innerblock \; in \; one \; side \; of \; mid-plane\}} Y_j = \quad (10a)$$

-continued $$\sum_{j \in \{inner\ block\ in\ the\ other\ side\ of\ mid-plane\}} Y_j \quad (10b)$$

$$X_{i0,45} = 1 \quad \forall i \quad (11a)$$

$$X_{i1,90} = 1 \quad \forall i \quad (11b)$$

$$X_{i2,-45} = 1 \quad \forall i \quad (11c)$$

$$X_{i3,0} = 1 \quad \forall i \quad (11d)$$

$$X_{ij,empty} = 1 \quad \forall i \text{ on free edge, } j \text{ in mid-plane} \quad (12a)$$

$$X_{ij,0} + X_{ij',0} = 1 \quad \forall i \text{ not on free edge,} \quad (12b)$$
$$j, j' \text{ in mid-plane, } n_{i0} = \text{odd}$$

$$X_{ij,0} + X_{ij',0} = 2 \quad \forall i \text{ not on free edge,} \quad (12c)$$
$$j, j' \text{ in mid-plane, } n_{i0} = \text{even}$$

In this example, the objective function (4) maximizes the total length of all edges that are not boundary edges, which is equivalent to minimizing the boundary length. The length of a common edge between panels i and i' is represented by $w_{ii'}$. The second term in the objective function is a small penalty that is applied if a panel uses the inner block, in order to force panels to use outer blocks, which will decrease stacking sequence rule violation. However, p is small enough such that the total ply boundary still drives most of the objective function.

A main constraint of ply shape optimization is constraint (5), which ensures that the number of plies for each orientation in each panel matches what was given by the user. If the ply sequence does not belong to the inner blocks, the number is multiplied by two to account for symmetry. Constraint (6) is an assignment constraint which ensures each panel will pick at most one sublaminate for each outer block. Note that each block has its own set of compatible sublaminate candidates that the optimizer is allowed to pick from.

The remaining constraints ensure that all variables are linked correctly. Constraint (7) links X variables and Y variables. M represents the total number of panels. This constraint forces X variables to be zero if Y value is zero for corresponding orientation k. In other words, this constraint forces X variables to be zero for all orientations that do not match the orientation in the guide. For an orientation that is used, thus having Y value as one, the constraint becomes non-active. Constraint (8) links X variables and Z variables. For ply sequences in outer blocks for each panel, this constraint ensures that X variables inherit their values from the sublaminate that was picked.

Since inner blocks are allowed to violate the stacking sequence rules, there is a risk of the expected mid-plane of the design not actually being the mid-plane. Constraints (9a) and (9b) identify whether a ply sequence in an inner block was used or not. Constraints (10a) and (10b) ensure the number of ply sequences used in the inner blocks on one side of the mid-plane is equal to the number of ply sequences on the other side, which makes the mid-plane a true mid-plane which might not be the same as the guide symmetry plane. Commercial optimization software such as provided by Gurobi may be used for both the guide generation and ply shape optimization.

In this example, constraints (11) and (12) are fixed values. The constraint (11) forces the X value so that the first ply sequence will be a full ply with 45° and will be followed by a full ply with 90°, −45°, and 0°. In effect, constraint (5) may be equivalent to the most outer block being fixed. Thus, this may ensure that a stacking sequence rule is satisfied by definition.

The constraint (12) regards two ply sequences in mid-plane. In this example, the controller assumes that the total number of ply sequences is even, which guarantees two ply sequences in the mid-plane. Constraint (12a) ensures that the free edges will not be taped. Constraint (6b) ensures that if a panel is not on a free edge of the composite part two 0° plies are present at the laminate mid-plane if the number of 0° plies is an even number. Constraint (12c) ensures only one 0° ply is present at the mid-plane if the number of 0° plies is an odd number.

Instead of allowing each ply in the inner blocks to be optimized independent of each other, the inner blocks may also be optimized using a library. Symmetry might be impossible if more than one ply orientation has an odd number of plies, and therefore the sublaminates for the inner blocks may not be filtered based on symmetry violation. Instead, sublaminates that violate symmetry might be assigned a penalty based on the degree of symmetry violation that may be added to the objective function if they are used.

User inputs may also be provided to the controller, such as a maximum allowed solution time, a number of total ply sequences in the guide, and a number of ply sequences in the inner blocks. Manufacturability improves as more time is allowed for the optimization. The total boundary reduces as the solution time increases, which is expected since this is the main part of the objective function for ply shape optimization.

Application to Aircraft Manufacturing

Figure 16:
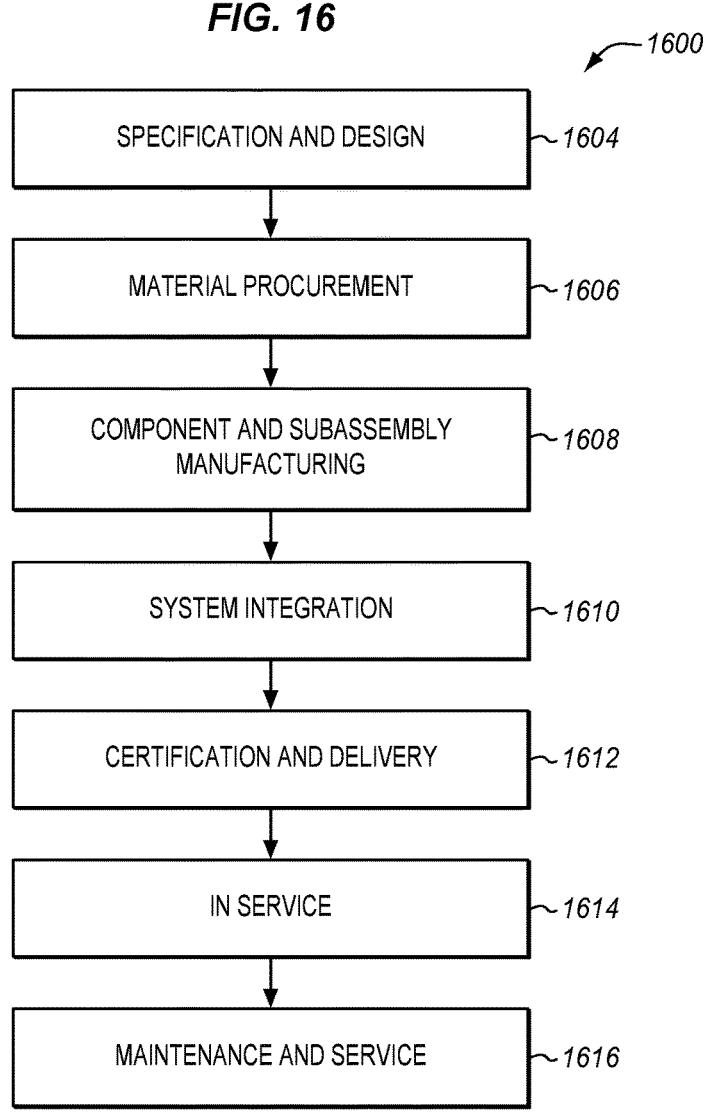
FIG. 16 is a flow diagram of aircraft production and service methodology in an exemplary embodiment.
Figure 17:
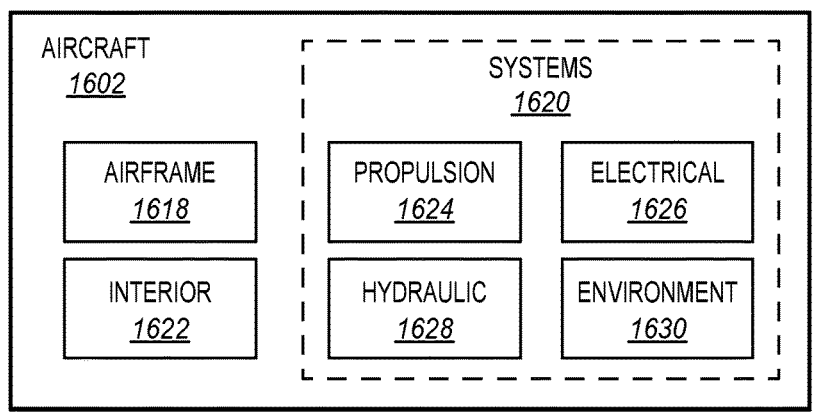
FIG. 17 is a block diagram of an aircraft in an exemplary embodiment.

Referring more particularly to the drawings, embodiments of the disclosure may be described in the context of an aircraft manufacturing and service method 1600 as shown in FIG. 16 and an aircraft 1602 as shown in FIG. 17. During pre-production, exemplary method 1600 may include specification and design 1604 of the aircraft 1602 and material procurement 1606. During production, component and subassembly manufacturing 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine maintenance and service 1616 (which may also include modification, reconfiguration, refurbishment, and so on).

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 1602 produced by exemplary method 1600 may include an airframe 1618 with a plurality of systems 1620 and an interior 1622. Examples of high-level systems 1620 include one or more of a propulsion system 1624, an electrical system 1626, a hydraulic system 1628, and an environmental system 1630. Any number of other systems may be included. Although an aerospace example is shown, the principles of the invention may be applied to other industries, such as the automotive industry.

Apparatus and methods embodied herein may be employed during any one or more of the stages of the production and service method 1600. For example, components or subassemblies corresponding to production stage 1608 may be fabricated or manufactured in a manner similar to components or subassemblies produced while the aircraft 1602 is in service. Also, one or more apparatus embodiments, method embodiments, or a combination thereof may be utilized during the production stages 1608 and 1610, for example, by substantially expediting assembly of or reducing the cost of an aircraft 1602. Similarly, one or more of apparatus embodiments, method embodiments, or a combination thereof may be utilized while the aircraft 1602 is in service, for example and without limitation, to maintenance and service 1616.

In one embodiment, composite design system 110 is utilized during specification and design of composite parts for a portion of airframe 118. This allows composite part 150 to be manufactured in component and subassembly manufacturing 1608, and then be assembled into an aircraft in system integration 1610. Part 150 may then be utilized in service 1614 until wear renders part 150 unusable. Then, in maintenance and service 1616, part 150 may be discarded and replaced with a newly manufactured part 150 based on a design created by composite design system 110.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
designing a multi-layer composite part by:
  prior to performing optimization of plies for the composite part:
    pre-generating a library of sublaminates comprising consecutive ply sequences;
    subdividing the part along its depth into blocks that each comprise a contiguous stack of layers within the part;
    identifying rules that constrain how layers that have different fiber orientations are stacked within the part;
    generating a guide for a block that prescribes a fiber orientation for each layer of the block and that complies with the rules after the library has been pre-generated;
    excluding sublaminates that are not compatible with the guide for the block from the library, wherein sublaminates that are compatible with the guide are subsets of the layers in the guide; and
    excluding sublaminates that do not comply with the rules from the library; and
  performing optimization of the plies for the composite part by:
    subdividing the part into panels that each comprise a fraction of the area of the composite part; and
    selecting one of the compatible sublaminates from the library for one of the panels of the block, based on compatible sublaminates for neighboring panels.

2. The method of claim 1 wherein:
selecting one of the compatible sublaminates comprises:
selecting a compatible sublaminate that reduces an aggregate boundary length of ply shapes within a layer of the composite part.

3. The method of claim 1 wherein:
selecting one of the compatible sublaminates comprises:
selecting a compatible sublaminate that reduces an aggregate number of cuts performed to generate ply shapes within the composite part.

4. The method of claim 1 wherein:
selecting one of the compatible sublaminates comprises:
selecting a compatible sublaminate that increases an average course length for ply shapes within the composite part.

5. The method of claim 1 wherein:
selecting one of the compatible sublaminates comprises:
selecting a compatible sublaminate that reduces an aggregate number of internal corners for ply shapes within the composite part.

6. The method of claim 1 wherein:
the sublaminates include empty layers where fiber is not applied to the panel.

7. The method of claim 1 wherein:
the sublaminates are configured to be stacked on top of each other within the composite part without violating the rules.

8. An apparatus comprising:
an interface configured to receive input indicating a geometry of a multi-layer composite part;
a controller configured to, prior to performing optimization of plies for the composite part: pre-generate a library of sublaminates comprising consecutive ply sequences, subdivide the part into blocks along its depth that each comprise a contiguous stack of layers within the part, identify rules that constrain how layers that have different fiber orientations are stacked within the part, generate a guide for a block that prescribes a fiber orientation for each layer of the block and that complies with the rules after the library has been pre-generated, exclude sublaminates that are not compatible with the guide for the block from the library, wherein sublaminates that are compatible with the guide are subsets of the layers in the guide, and exclude sublaminates that do not comply with the rules from the library the controller is further configured to perform optimization of the plies for the composite part by: subdividing the part into panels that each comprise a fraction of the area of the composite part, and selecting one of the compatible sublaminates from the library for one of the panels of the block, based on compatible sublaminates for neighboring panels; and a memory configured to store the design as a combination of selected sublaminates for use by an Automated Fiber Placement (AFP) machine constructing the part.

9. The apparatus of claim 8 wherein:
the controller is configured to select a compatible sublaminate by selecting a compatible sublaminate that that reduces an aggregate boundary length of ply shapes within a layer of the composite part.

10. The apparatus of claim 8 wherein:
the controller is configured to select a compatible sublaminate by selecting a compatible sublaminate that reduces an aggregate number of cuts performed to generate ply shapes within the composite part.

11. The apparatus of claim 8 wherein:
the controller is configured to select a compatible sublaminate by selecting a compatible sublaminate that increases an average course length for ply shapes within the composite part.

12. The apparatus of claim 8 wherein:
the controller is configured to select a compatible sublaminate by selecting a compatible sublaminate that reduces an aggregate number of internal corners for ply shapes within the composite part.

13. The apparatus of claim 8 wherein:
the compatible sublaminates include empty layers where fiber is not applied to the panel.

14. The apparatus of claim 8 wherein:
the compatible sublaminate are capable of being stacked together with each other within the composite part without violating the rules.

15. A non-transitory computer readable medium embodying programmed instructions which, when executed by a processor, are operable for performing a method comprising:
designing a multi-layer composite part by:
prior to performing optimization of plies for the composite part:
pre-generating a library of sublaminates comprising consecutive ply sequences;
subdividing the part along its depth into blocks that each comprise a contiguous stack of layers within the part;
identifying rules that constrain how layers that have different fiber orientations are stacked within the part;
generating a guide for a block that prescribes a fiber orientation for each layer of the block and that complies with the rules, after pre-generating the library of sublaminates;
excluding sublaminates that are not compatible with the guide for the block from the library, wherein sublaminates that are compatible with the guide are subsets of the layers in the guide; and
excluding sublaminates that do not comply with the rules from the library; and
performing optimization of the plies for the composite part by:
subdividing the part into panels that each comprise a fraction of the area of the composite part; and
selecting one of the compatible sublaminates from the library for one of the panels of the block, based on compatible sublaminates for neighboring panels.

16. The medium of claim 15, wherein:
selecting one of the compatible sublaminates comprises:
selecting a compatible sublaminate that reduces an aggregate boundary length of ply shapes within a layer of the composite part.

17. The medium of claim 15, wherein:
selecting one of the compatible sublaminates comprises:
selecting a compatible sublaminate that reduces an aggregate number of cuts performed to generate ply shapes within the composite part.

18. The medium of claim 15, wherein:
selecting one of the compatible sublaminates comprises:
selecting a compatible sublaminate that increases an average course length for ply shapes within the composite part.

19. The medium of claim 15, wherein:
selecting one of the compatible sublaminates comprises:
selecting a compatible sublaminate that reduces an aggregate number of internal corners for ply shapes within the composite part.

20. The medium of claim 15 wherein:
the sublaminates include empty layers where fiber is not applied to the panel.

21. A method comprising:
receiving input indicating a geometry of a multi-layer composite part;
prior to performing optimization of plies for the composite part:
pre-generating a library of sublaminates comprising consecutive ply sequences;
generating a design indicating an arrangement of ply sequences for the part;
subdividing the part along its depth into blocks that each comprise a contiguous stack of layers within the part;
identifying rules that constrain how layers that have different fiber orientations are stacked within the part;
identifying sets of fiber orientations for a block that comply with the rules and are from the library;
subdividing the block into panels that each comprise a fraction of the area of the composite part;
performing optimization of plies for the composite part by:
selecting one of the sets of fiber orientations for one of the panels, based on sets of fiber orientations for neighboring panels; and
configuring a memory to store the design for use by an Automated Fiber Placement (AFP) machine constructing the part.

22. The method of claim 21, wherein
selecting one of the compatible sublaminates comprises:
selecting a compatible sublaminate that reduces an aggregate boundary length of ply shapes within a layer of the composite part.

* * * * *